April 24, 1962   W. N. MILLER, JR   3,030,855
OPTICAL PROJECTION DISPLAY APPARATUS
Filed March 17, 1958   3 Sheets-Sheet 1

INVENTOR.
William N. Miller, Jr.
BY
ATTYS

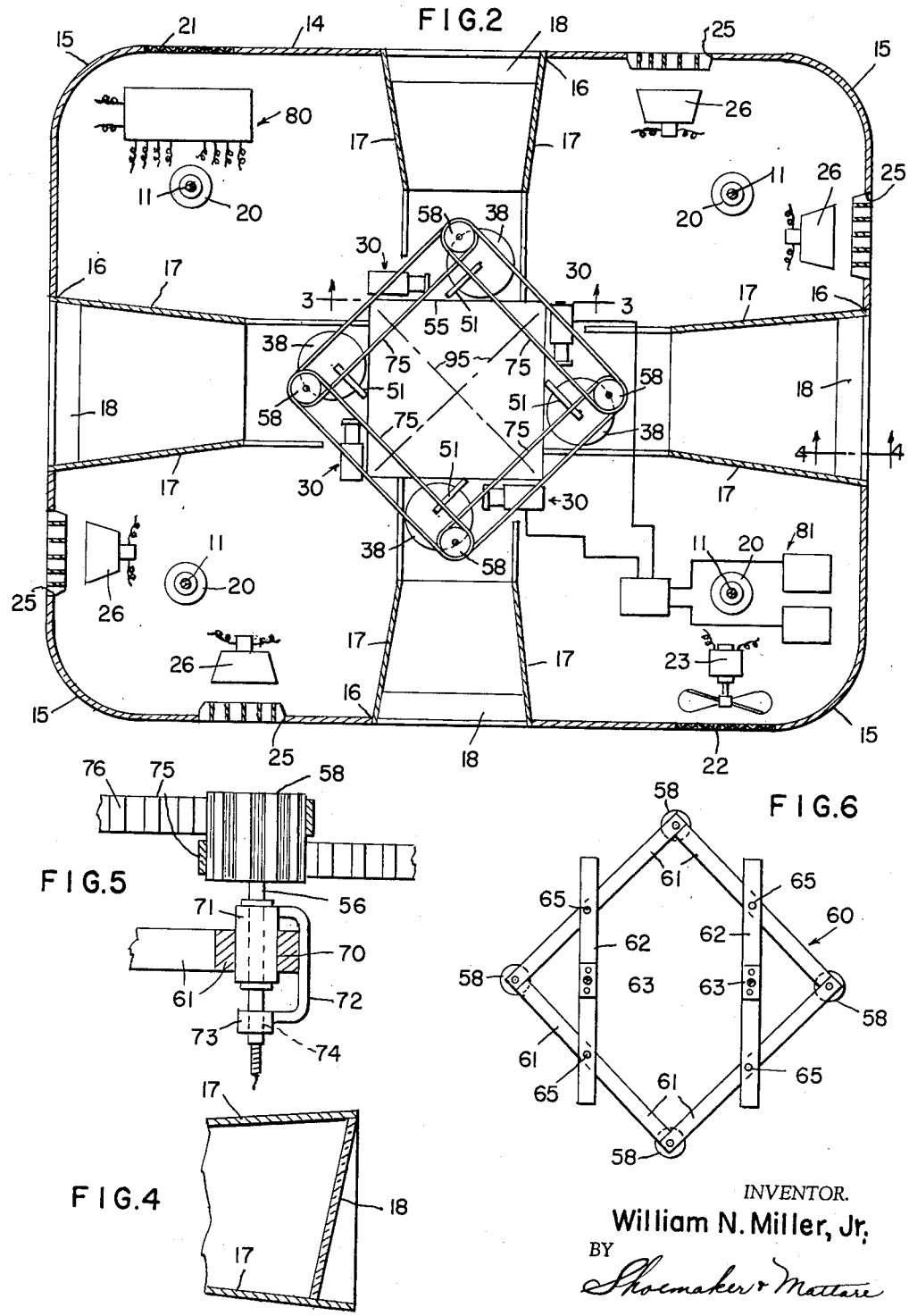

April 24, 1962 W. N. MILLER, JR 3,030,855
OPTICAL PROJECTION DISPLAY APPARATUS
Filed March 17, 1958 3 Sheets-Sheet 3
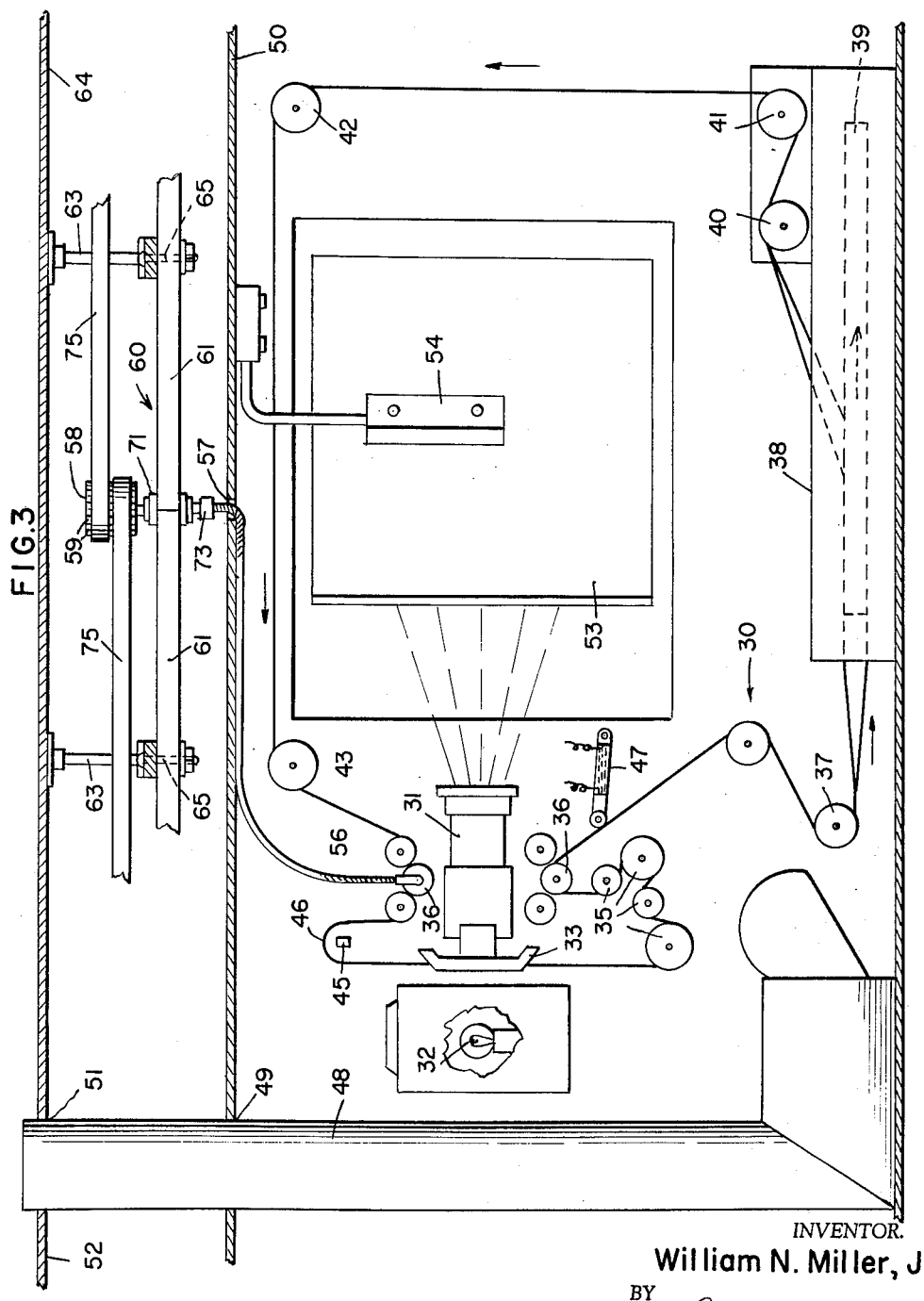
INVENTOR.
William N. Miller, Jr.
BY
Shoemaker & Mattare
ATTYS United States Patent Office 3,030,855
Patented Apr. 24, 1962

3,030,855
OPTICAL PROJECTION DISPLAY APPARATUS
William N. Miller, Jr., Greenville, S.C., assignor to Shop-O-Rama, Inc., Greenville, S.C., a corporation of South Carolina
Filed Mar. 17, 1958, Ser. No. 721,827
2 Claims. (Cl. 88—16.2)

The present invention relates to a new and novel display apparatus, and more particularly to a display apparatus adapted to be mounted in an elevated position in such a manner as to be observed from substantially all sides thereof.

The present invention is adapted to be utilized in any type of store or similar place where prospective customers may be influenced by the advertising presented in the display apparatus. The present invention, however, is especially well adapted for use in supermarkets or the like wherein it is mounted in an elevated position, preferably from the ceiling, in a central location in the store. Screen means is provided in the apparatus upon which moving pictures are projected, and a sound reproducing system simultaneously provides an audible accompaniment for the film in the form of narrative or music as the case may be.

The moving picture presented on the screen means of the invention apparatus will ordinarily comprise advertising which is intended to induce customers within the market to buy certain products. This form of advertising is particularly suitable in food markets and provides an ideal advertising medium since the potential customer receives the advertising at the most desirable time, when the customer is in the market ready to buy and is most susceptible to suggestion. It is apparent that the advertising medium provided by the present invention having such a commanding location, being presented at the proper psychological time, and utilizing motion and audibility, represents the ultimate in advertising for products which are sold in self-service stores or the like.

The possibility of advertising in supermarkets has been considered before, and various attempts have been made to design devices suitable for such advertising. For example, advertising displays have been employed wherein a picture is presented on the screen and is provided with an accompanying sound reproduction system. Such prior art devices have provided moderate success, but have not proved adequately successful because of the fact that they may be viewed from only a limited area and, accordingly, are not suitable for advertising a variety of products which may be in scattered locations throughout the store.

The present invention overcomes the difficulties encountered in prior art devices by providing an apparatus which is mounted in an elevated position in a central location in the store. The apparatus is provided with a screen means having a plurality of viewing areas disposed in such a manner that regardless of where the customer is in the store, one or more of the viewing areas will be visible such that the customer is continually subjected to the moving picture and sound presented by the apparatus. The screen means of the apparatus is so disposed that the customer in the store can easily view the moving picture being shown on the screen means by merely glancing upwardly from the goods mounted in a conventional manner on the racks within the store.

The invention apparatus is housed within a hollow body means suitably suspended from the ceiling in the store and having an exterior appearance which makes it pleasing to the eye. In the embodiment shown in the drawings, the body means defines a four-sided figure, each of the sides having a screen disposed substantially in the center thereof, and the screen sloping downwardly and inwardly of the body means such that it may be more readily viewed by customers standing on the floor of the store. Loud speakers are also mounted in the outer walls of the body means for directing the sound outwardly in all directions from the apparatus. Auxiliary speakers may be mounted throughout the store, if desired, in order to provide a more complete sound saturation throughout the area of the store.

The screens of the apparatus are of conventional rear projection type, and a continuously running movie projector is associated with each screen for projecting a moving picture on the screen. Each of the projectors is provided with a driving means having a synchronizing pulley drivingly connected therewith by means of a flexible cable. The synchronizing pulleys connected with each of the projectors are interconnected by means of belts, whereby the driving means of all the projectors are constrained to move in unison.

The moving picture films employed for such advertising purposes are provided with accompanying sound tracks, and two of the projectors are provided with sensing means which serves as a sound pick up from the sound tracks of the films in the projectors. Each of the sensing means is connected through a switch means to an output amplifier. Each of the pair of output amplifiers is connected to the loud speakers employed with the apparatus, and the switch means serves as a standby mechanism whereby only one of the output amplifiers operates at any given time, and the other amplifier is switched into operation upon failure of the first mentioned amplifier. A control means is provided for selectively starting and stopping the projectors, and includes a timing mechanism whereby the starting and stopping of the apparatus may be made entirely automatic.

The above described arrangement according to the present invention provides an apparatus which presents simultaneously a plurality of identical moving pictures on different screens facing in different directions such that the moving picture may be viewed from any position around the apparatus. The accompanying sound for the moving picture is picked up from the film in one of the projectors of the apparatus, and the operation of each of the projectors is synchronized such that the sound will be in proper timed relationship to the moving pictures appearing on each separate screen.

An object of the present invention is to provide a new and novel display apparatus adapted to be mounted in a central position in a store to provide a visual and audio advertising presentation to customers in the store.

Another object of the invention is the provision of a display apparatus which can be viewed from substantially all directions therearound.

A further object of the invention is to provide a display apparatus wherein the moving pictures appearing on the various viewing areas of the apparatus and the sound produced by the sound reproduction system of the apparatus are all substantially synchronized with one another.

Yet another object of the invention is to provide a display apparatus which is efficient and reliable in operation, yet simple and inexpensive in construction.

Other objects and many attendant advantages of the present invention will become more apparent when considered in connection with the following specification and accompanying drawings wherein:

FIG. 2 is a top sectional view of the apparatus;

FIG. 3 is a view taken substantially along line 3—3 of FIG. 2 looking in the direction of the arrows;

FIG. 4 is a view taken along line 4—4 of FIG. 2 looking in the direction of the arrows;

FIG. 5 is an enlarged view of a portion of the device shown in FIG. 2;

FIG. 6 is a plan view illustrating the manner in which the synchronizing pulleys of the device are supported.

Figure 1:
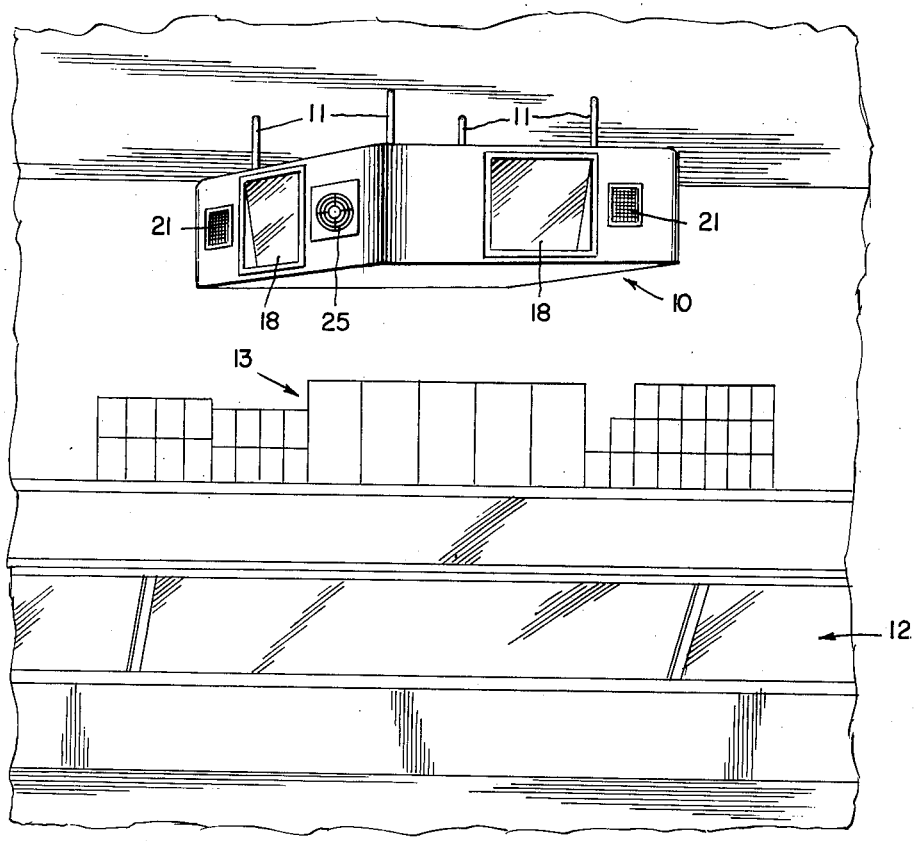
FIG. 1 illustrates the invention apparatus suspended from the ceiling and disposed at a central location in a typical super market.

Referring now to FIG. 1 of the drawings, the display apparatus indicated generally by reference numeral 10 is suspended from the ceiling of the store by four tubular supported members 11 extending downwardly and having lower end portions thereof secured to suitable means disposed inside the body means as more fully hereinafter described. A conventional display cabinet 12 is mounted upon the floor of the store and goods indicated generally by reference numeral 13 are stacked upon the upper surface of the display cabinet.

As seen most clearly in FIG. 2 of the drawings, the body means 14 of the apparatus is substantially rectangular in configuration and has rounded corners 15. Four cut-out portions 16 are formed in the center of each of the sides of the body means, and walls 17 taper inwardly toward the center of the body means both from the sides and from the top and bottom of openings 16 to provide a suitable shadow box to prevent loss of light between the projectors and the screens of the apparatus. A conventional rear projection screen 18 is mounted in each of openings 16, and as seen most clearly in FIG. 4, the screen slopes downwardly and inwardly of the body means such that it is disposed on an angle, whereby it may be more easily viewed directly by customers standing on the floor beneath the apparatus.

Four equally spaced plates 20 are fixed to the lower surface of the body means, and tubular members 11 are secured to the plates whereby the body means may be supported in elevated position. An air intake opening 21 is provided in the upper side wall, as seen in FIG. 2, and an air outlet opening 22 is provided in the lower side wall as seen in this figure. A fan 23 is supported within the body means adjacent outlet opening 22 and is adapted during operation to create a draft of air through openings 21 and 22 to cool the interior of the body means.

Four loud speaker openings 25 having suitable grill work thereover are provided in the side walls of the body means and loud speakers 26 are mounted adjacent thereto for directing sound outwardly from the apparatus during operation.

The projectors employed in the present invention are of the continuous operating type identified commercially by the trademark "Cinesalesman," manufactured by the Busch Film and Equipment Company of Saginaw, Michigan. As seen most clearly in FIG. 3, each of these projectors 30 includes a lens 31 and a conventional illuminating lamp 32, a shutter 33 being provided between the lamp and the lens. The film is threaded over a plurality of fairly conventional sprockets 35 and passes around driving sprockets 36. The film travels in the direction as indicated by the arrows, and the film leaving the lowermost sprocket 37 passes into a cylindrical casing 38 where it is wound upon a reel 39. The film passes inwardly and subsequently is fed out over a sprocket 40 and thence about sprockets 41, 42 and 43, whereupon it again is engaged by the sprockets of the projector. This structure provides continuous operation and the film will continue to be shown over and over again as long as it is intact. A micro switch 45 is provided for automatically stopping the driving motor of the projector if the loop portion 46 should grow too small, thereby not providing an adequate slack in the film. A mercury switch 47 is also provided for automatically stopping the driving mechanism of the projector if the film should break. The mercury switch is normally urged in a downward direction, and if the film breaks, the arm of the switch will rotate downwardly, thereby disconnecting the circuit through the switch. A tubular shaped member 48 has the lower end thereof in communication with the interior of the projector and member 48 extends upwardly through an opening 49 formed in a transverse wall 50 and thence upwardly through a second opening 51 formed in the upper wall 52 of the body means. The exhaust conduit 48 provides a cooling means whereby the hot air generated within the projector may pass upwardly and out of the body means, thereby allowing cool air to enter the projector thereby providing more efficient cooling of the projector during operation.

A mirror 53 is suspended by means of a bracket 54 from the lower surface of a transversely extending wall 50, the mirror being disposed on an angle such that the light emitted through the lens 31 is reflected by the mirror onto the rear of the associated screen. The relationship of each of the mirrors to its associated projector may be seen more clearly in FIG. 2 wherein it is apparent that each of the mirrors is adapted to direct the moving picture images upon the associated screens 18. A central substantially square opening 55 is provided in the lower wall of the body means for providing access to the interior thereof. Opening 55 may be closed by any suitable means such as a trap door or the like. The four continuously operating projectors 30 are supported by the lower surface of the body means closely adjacent to opening 55, thereby enabling repairs or adjustments to be easily and quickly made.

Referring again to FIG. 3, the upper driving sprocket 36 has a positive driving connection with a flexible cable 56 which extends upwardly through an opening 57 provided in wall 50, the upper end of the flexible cable having a positive driving connection with a pulley 58 having longitudinally extending notches 59 formed in the outer surface thereof, the pulley being of the type known commercially as a "Gilmer" pulley. The upper end portions of the flexible cables adjacent the pulleys 58 are supported by a rigid framework indicated generally by reference numeral 60, and as seen most clearly in FIG. 6, the framework is substantially rectangular in configuration, and comprises four elongated frame members 61 having the adjacent ends thereof fixed to one another. The framework is supported in position by means of two elongated support members 62 supported by brackets 63 to the upper wall 64 of the body means. Each of the elongated members 61 is secured to support member 62 by means of bolt assemblies 65.

Referring to FIG. 5, the manner of rigidly supporting the upper end of the flexible cables is more clearly seen. The outer end of support member 61 has an opening 70 formed therethrough within which is tightly fitted a bushing 71. One of the flexible cables 56 extends upwardly through bushing 71 and is rotatably journalled therein. The bushing has a generally U-shaped arm 72 secured to the upper end thereof and extending downwardly and terminating in a collar 73. The flexible cables 56 also extend through and are rotatably journalled within an opening 74 formed through collar portion 73. In this manner, the upper end of the flexible cables is rigidly supported and undesirable flexing thereof is eliminated.

Each of pulleys 58 is connected to an adjacent pulley 58 by means of timing belts 75 having teeth 76 formed thereon which positively engage the notches 59 formed on the timing pulleys, thereby providing a positive interconnection between all of the timing pulleys 58. Timing belt 75 may be of the type known commercially as "Gilmer" timing belts. As seen most clearly in FIG. 3, each of pulleys 58 has two belts 75 in engagement therewith, one of the belts being disposed over the other belt. The upper belt 75, as seen in FIG. 3, is in engagement with the upper portion of an adjacent pulley, and the lower belt 75, as shown in FIG. 3, is in engagement with the lower portion of the adjacent pulley. As seen most clearly in FIG. 2, it is evident that all four of the pulleys 58 are positively interconnected by belts 75. The flexible cables 56, pulleys 58 and belts 75 provide a positive interconnection between the driving means of each of the projectors 30, whereby the projectors are all constrained to rotate in unison, thereby providing a substantial synchronism between the pictures projected by each of the projectors.

As seen in FIG. 2, a timing mechanism indicated generally by reference numeral 80 is disposed in the upper left hand portion of the body means as seen in this figure, and a portion of the sound reproducing mechanism indicated by reference numeral 81 is disposed in the lower right hand portion of the body means as seen in this figure. It is apparent that the disposition of the timing and sound reproducing mechanisms is a matter of choice, and the arrangement shown is considered desirable since the loud speakers 26 are disposed in the upper right hand and lower left hand portions of the body means as seen in FIG. 2.

Figure 7:
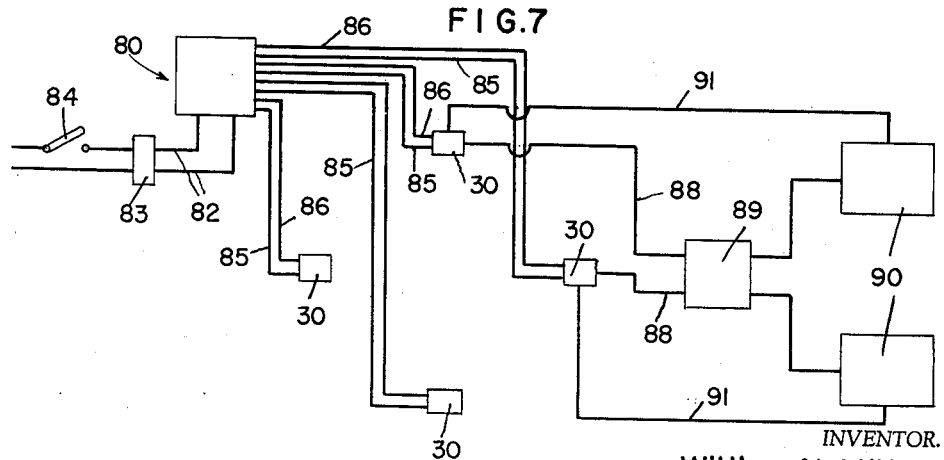
FIG. 7 is a schematic wiring diagram of the electrical circuit of the apparatus.

Referring to FIG. 7, a schematic diagram of the control means of the invention apparatus is illustrated. Timing mechanism 80 includes the conventional twenty-four hour clock which may be set so as to turn the projectors on and off at any desired time. The timing mechanism serves to turn the projectors on and off and is connected by suitable leads 82 to an input plug 83 which may be disposed in any suitable portion of the body means. The input plug 83 may be in turn connected to a suitable source of electrical energy through a switch 84 disposed at some remote position in the store for controlling operation of the apparatus. Projectors 30 are each connected by a pair of leads 85 and 86 to the timing mechanism 80, lead 85 being connected to the motor of the projector and lead 86 being connected to the bulb of the projector. Two of the projectors are connected by leads 88 to an electronic switch 89 and conduct sound signals from the sound tracks of the films within these two projectors to the electronic switch 89. The output of switch 89 is connected to two similar output amplifiers 90 which each are connected to the four loud speakers 26, and any additional loud speakers which may be employed in the system. Each of amplifiers 90 is provided with a feed back channel through leads 91 to the sound sensing apparatus of the two projectors for energizing the sound sensing mechanism of the projectors. Electronic switch 89 normally connects the sound output of only one of said projectors through switch 89 and to only one of the output amplifiers 90. If, for some reason, there is an interruption of the sound signal passing through electronic switch 89 for a period of 15 seconds to the normally operating output amplifier 90, the electronic switch 89 will automatically switch to a position such that the other sound producing projector and output amplifier are connected to the loud speakers. When the second output amplifier is thus switched into the output circuit, the sound sensing mechanism within the second projector is energized by a signal which passes thereto through the associated lead 91.

When the apparatus is automatically shut off by the timing mechanism 80, the circuit through leads 86 to the bulbs in the projectors is first de-energized, and a time delay of 15 minutes is provided before the circuit through leads 85 is interrupted to thereby stop the motors of the projectors. This time delay permits the film to run 15 minutes after the bulbs have been deenergized, thereby allowing the bulbs to cool adequately such that a particular portion of the film is not subjected to excess heat which would tend to damage it.

The apparatus as disclosed herein is considered to be a preferred embodiment but it is apparent that many modifications may be made within the scope of the present invention. For example, although four screens have been shown disposed in equally angularly spaced relationship from one another, it is apparent that screen means may be employed having a number of viewing areas other than four provided thereon, as long as at least one of the viewing areas is visible from substantially any position thereabout. Of course, as disclosed, the screens are not clearly visible from a position immediately below the center of the apparatus, but, of course, an additional screen may be provided in the undersurface of the apparatus if desired, although this is not considered necessary since only a small area directly underneath the apparatus is involved. It is also evident that the number of loud speakers and location thereof may be varied in accordance with the particular situation. All of the loud speakers may be housed within the body means as shown in the drawings, or auxiliary loud speakers may be provided through the store and connected to the output amplifiers of the apparatus. In such a case, the volume of the loud speakers within the body means is preferably higher than that of any auxiliary loud speakers to draw the attention of the customers to the apparatus.

Since the sound is picked up from the sound track of only one of the films, it is essential that the films in the different projectors be maintained in substantial synchronism during the entire cycle of operation of the apparatus. This is accomplished in the present invention by providing a positive mechanical driving interconnection between the driving motors of each of the projectors. Although screens 18 have been shown as sloping downwardly and inwardly with respect to the body means, it is apparent that they may be mounted in various other angular relationships, although it is considered preferable to incline the screens as shown such that they are more directly in the line of vision of an observer standing on the floor of the store.

In order to provide maximum illumination of the screens, the screens are provided with shadow boxes 17 as previously described, and in addition a suitable light trap may be mounted in the center of the body means over opening 55 for preventing light from travelling between the various projector screen assemblies. This light trap may preferably be in the form of two wall members disposed at right angles to one another and illustrated schematically by phantom lines 95 in FIG. 2. It is further apparent that, although the apparatus has been disclosed as being suspended from the ceiling of the store, any suitable means may be employed for mounting it in an elevated position, as for example by suspending it by means of wires, or mounting it upon a suitable structure extending upwardly from the floor of the store.

It is apparent from the foregoing that there is provided a new and novel display apparatus which is adapted to be mounted in an elevated position at a central location in a store. The apparatus provides a moving picture visual presentation accompanied by suitable sound, thereby providing an ideal advertising medium at the most desirable time and place. The apparatus can be easily observed and heard by customers by merely glancing up from the display stands within the store, and the screen means of the apparatus is so disposed that at least one of the viewing areas is visible from substantially any position within the store. In this manner, the customer is continually exposed to the advertising presented by the apparatus during the entire time that the customer is in the store. The sound and moving pictures appearing on each of the viewing areas of the screen means are substantially synchronized with one another, thereby providing the proper effect. The apparatus is efficient and reliable in operation, and yet is simple and inexpensive in construction.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Display advertising apparatus adapted to be mounted in an elevated position within a store for presenting advertising material to customers to induce them to purchase the merchandise within the store, the apparatus comprising a body means having a plurality of angularly spaced faces, each of said faces including a rear projection screen, shadow box means extending inwardly from each of said screen means for preventing undesired light from falling upon said screen means, a plurality of motion picture projectors mounted at the center portion of said body means, one of said projectors being associated with each of said screens, means for directing the light beam of each of said projectors upon the associated screen, drive means associated with each of said projectors, positive driving interconnections between each of said drive means whereby the projectors are operated in synchronism, and sound reproducing means supported within said body means and associated with said projectors for producing audible sound in timed relationship with the projection of motion pictures upon the screens by the projectors such that visible and audible advertising matter is presented to the customers within the store at all times.

2. Display advertising apparatus adapted to be mounted in an elevated position within a store for preventing advertising matter to customers within the store to induce them to purchase the merchandise within the store, the apparatus comprising a body means having a plurality of angularly spaced faces, cut-out portions formed in each of said faces, a rear projection screen supported within each of said cut-out portions, shadow box means extending inwardly from each of said cut-out portions toward the center of said body means for preventing undesired light from falling upon said screen means, a plurality of motion picture projectors mounted at the center portion of said body means, one of said projectors being associated with each of said screens, the projectors being disposed such that they direct a beam of light at an angle other than normally to the associated screen means, means for reflecting the light beam of each of said projectors upon the associated screen thereby providing a compact arrangement, drive means associated with each of said projectors, positive driving interconnections between each of said drive means whereby the projectors are operated in synchronism, and sound reproducing means supported within said body means and associated with said projectors for producing audible sound in timed relationship with the projection of motion pictures upon the screens by the projectors such that visible and audible advertising matter is presented to the customers within the store at all times.

References Cited in the file of this patent

UNITED STATES PATENTS

| | | |
|---|---|---|
| 1,806,617 | Ebeling | May 26, 1931 |
| 1,877,441 | Andvig | Sept. 13, 1932 |
| 1,903,950 | Weinberger | Apr. 18, 1933 |
| 1,921,853 | Whitaker et al. | Aug. 8, 1933 |
| 1,931,668 | Maurer | Oct. 24, 1933 |
| 1,945,926 | Tolhurst | Feb. 6, 1934 |
| 1,957,947 | Dreyfuss | May 8, 1934 |
| 2,101,126 | Babb | Dec. 7, 1937 |
| 2,373,013 | Clark et al. | Apr. 3, 1945 |
| 2,430,893 | Todd | Nov. 18, 1947 |
| 2,436,032 | Benfelt | Feb. 17, 1948 |
| 2,608,126 | Oestreicher | Aug. 26, 1952 |